June 13, 1967   E. E. LEWIS ETAL   3,324,740
POWER SYSTEM CONTROL
Filed June 1, 1966   5 Sheets-Sheet 1
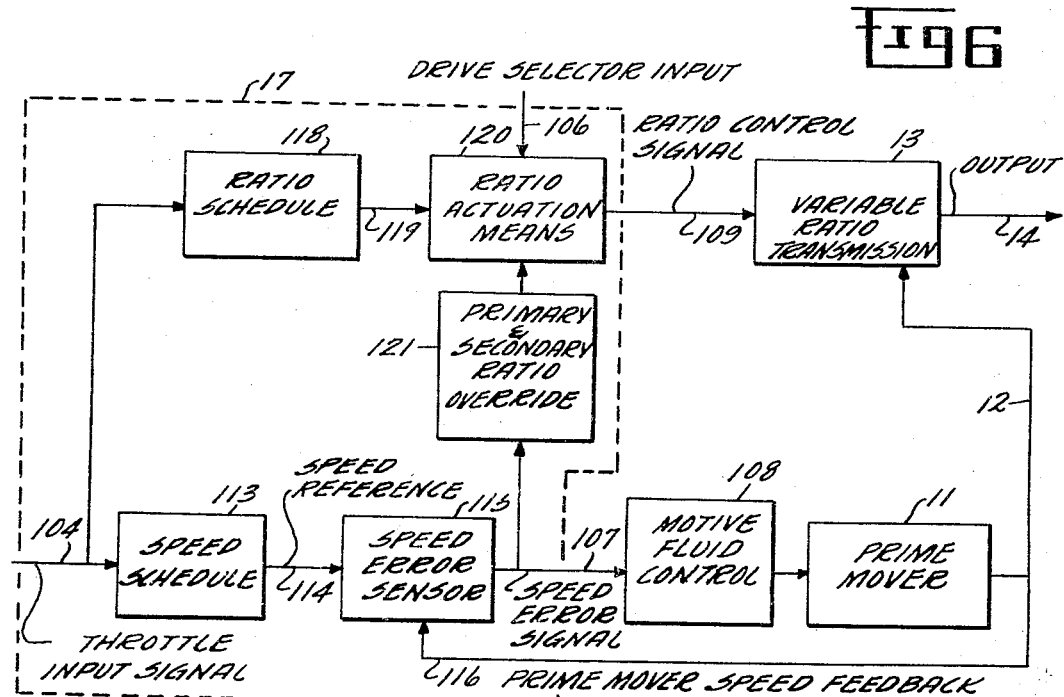
INVENTORS
CHARLES A. MAHER, Jr.
ERNEST E. LEWIS
BY
Gerald L. Moore
ATTORNEY

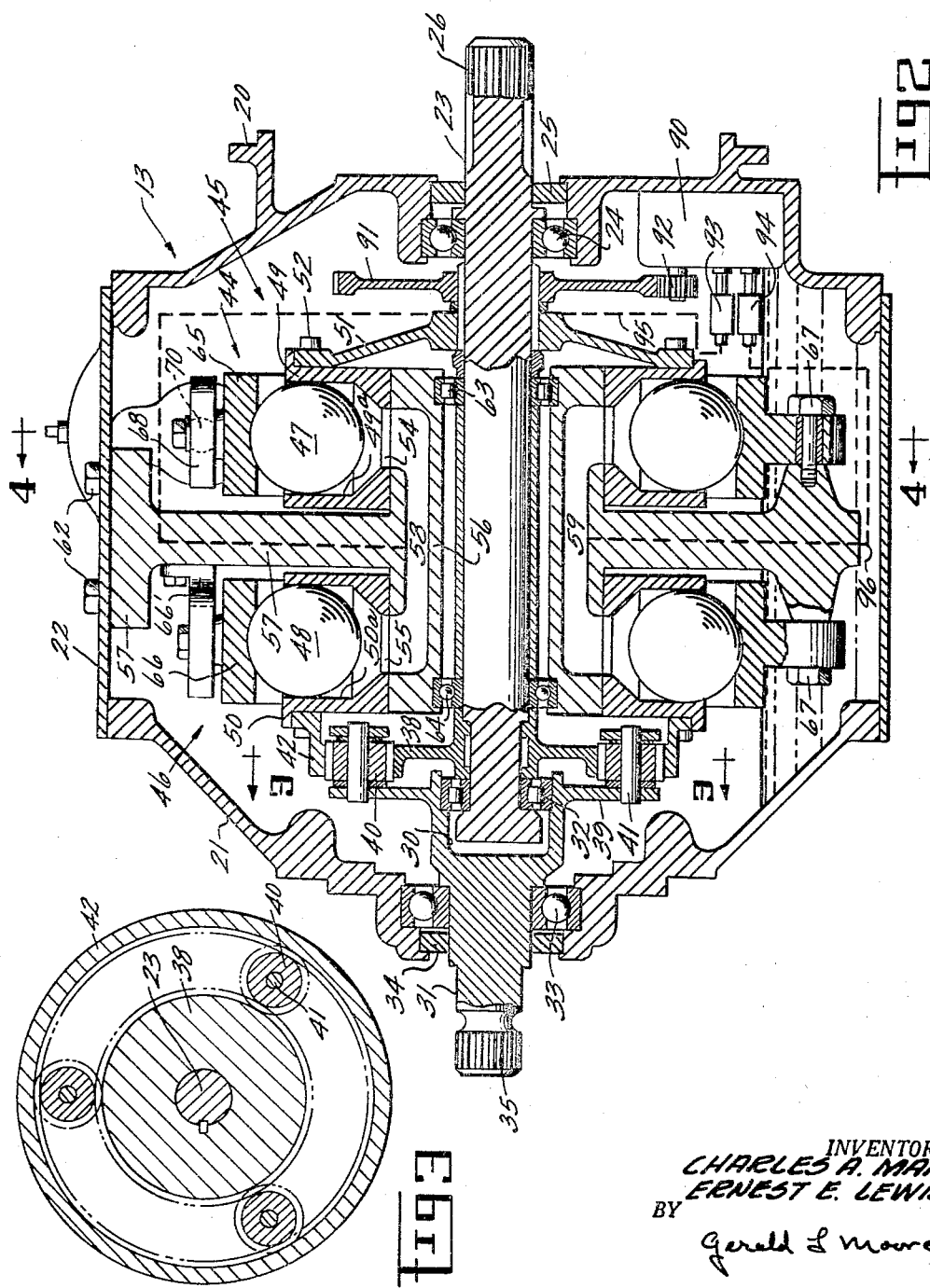

INVENTORS.
CHARLES A. MAHER, Jr.
ERNEST E. LEWIS
BY
Gerald L Moore
ATTORNEY

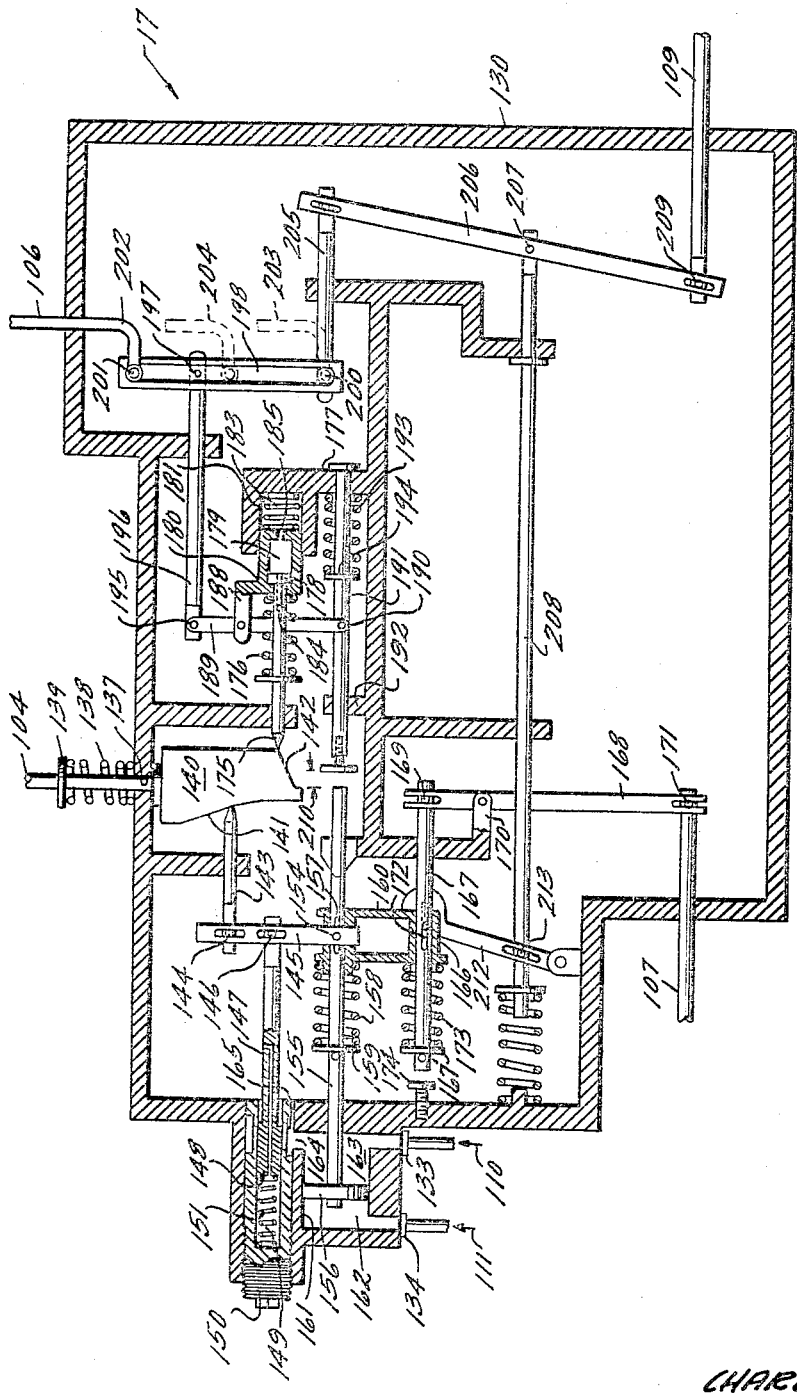

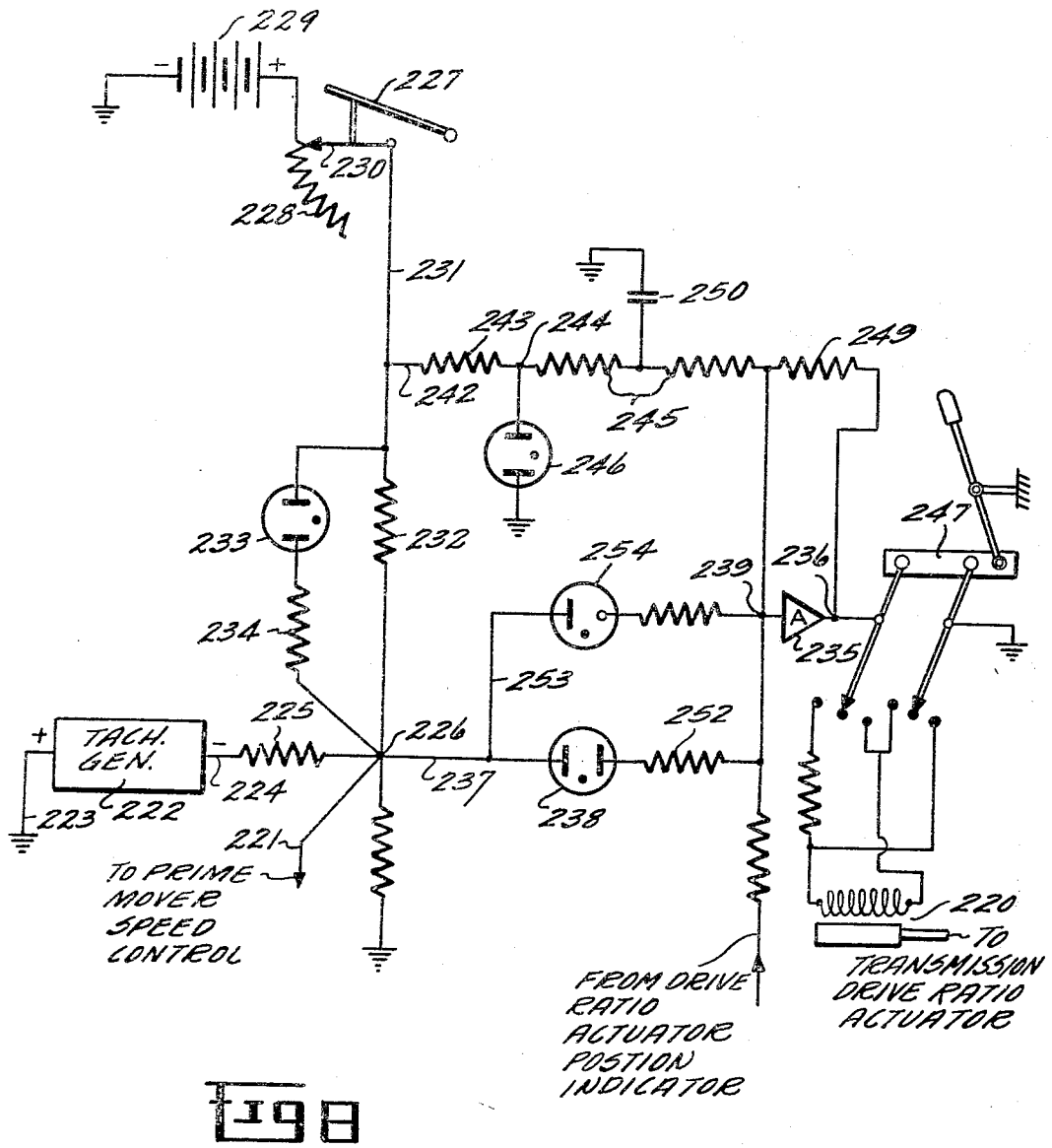

United States Patent Office 3,324,740
Patented June 13, 1967

3,324,740
POWER SYSTEM CONTROL
Ernest Eber Lewis, Topsfield, and Charles Anthony Maher, Jr., Wakefield, Mass., assignors to General Electric Company, a corporation of New York
Filed June 1, 1966, Ser. No. 560,365
12 Claims. (Cl. 74—472)

This application is a continuation-in-part of an application entitled, "Power System Control," Ser. No. 265,731, filed Mar. 18, 1963, now abandoned.

This invention relates generally to a power system control, and, more particularly, to an integrated control for achieving optimum operation of a power system comprising a continuously variable drive ratio transmission and a prime mover.

There are well recognized advantages in connecting a prime mover to its load with a continuously variable drive ratio transmission. Such a system eliminates the need for shifting or other step changes which cause shocks to and resulting excessive wear of the power system. In addition, it becomes possible to operate the prime mover at or near a power level at which maximum efficiency occurs.

Since both the prime mover and the transmission have various conditions of operation, optimum operation of the combination requires integration of their controls. Devising a suitable integrated control is complicated since for any desired speed output there are an infinite number of prime mover speed settings and transmission drive ratios to supply it.

It is therefore one object of this invention to provide control units for a power system utilizing a continuously variable drive ratio transmission and a prime mover.

It is another object of this invention to provide control units for power systems which control concurrently both the prime mover power output and the power transmission drive ratios for optimum operating efficiency.

Another object of this invention is to provide a control unit for a power system to control the prime mover motive fluid input and allow its operation at the maximum power output when necessary.

In accordance with one embodiment of the invention, there is provided a power system integrating a prime mover and a continuously variable drive ratio transmission with a control unit to control the motive fluid input to the prime mover and the drive ratio of the transmission for optimum performance of the power system. The control unit regulates the motive fluid input to the prime mover and the drive ratio to the transmission in response to signal inputs indicating the speed desired from the power system, the actual speed or power output of the prime mover and the direction of drive required for the driven unit.

Other objects and many of the attendant advantages of this invention will be readily appreciated as the same becomes better understood by reference to the following detailed description when considered in connection with the accompanying drawings wherein:

FIG. 1 is a fragmentary view of a power system incorporating control means in accordance with the invention;

FIG. 2 is a cross-sectional view of a power transmission suitable for use with the subject invention;

FIG. 3 is a schematic cross-sectional view taken along the lines 3—3 of FIG. 2 showing one type of differential gearing arrangement thereof;

FIG. 6 is a block diagram of the control system of FIG. 1;

FIG. 7 is a schematic illustration of a mechanical embodiment of the control unit of FIG. 6 and FIG. 8 is a schematic illustration of an electrical embodiment of the control unit of FIG. 6.

Figure 4:
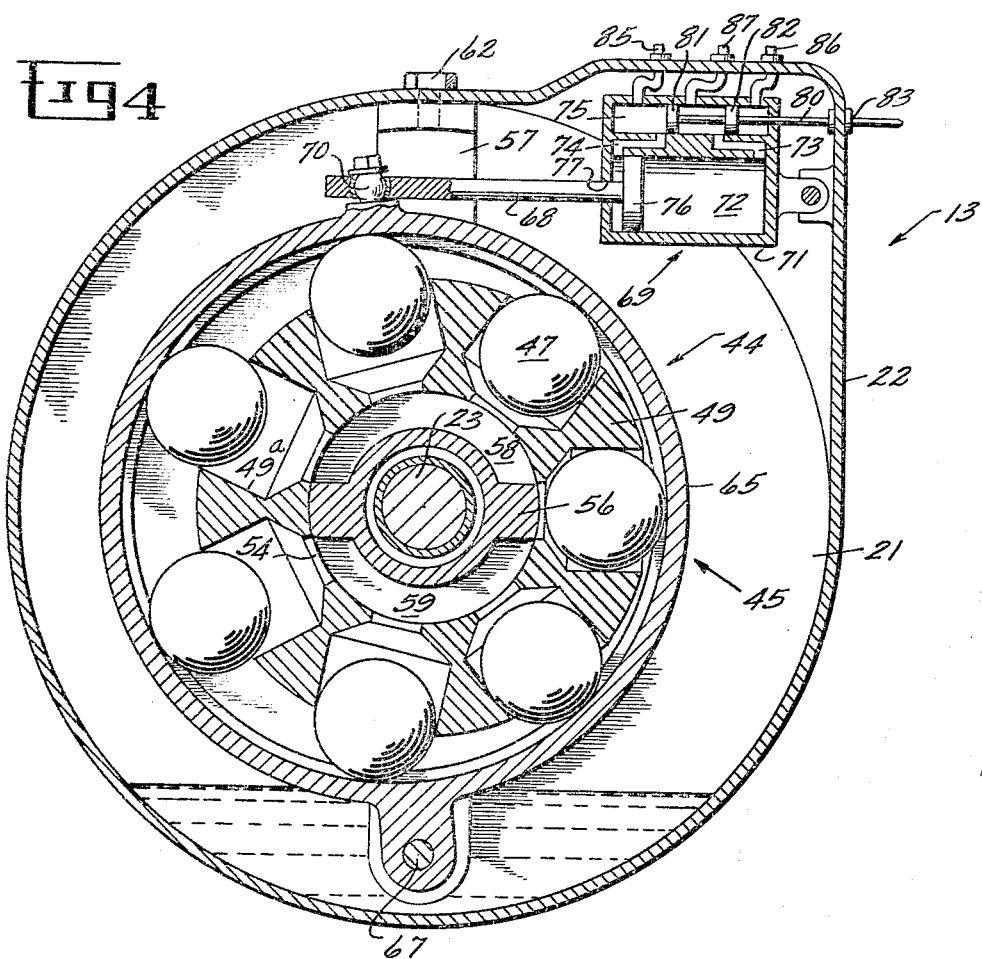
FIG. 4 is a cross-sectional view along the lines 4—4 of FIG. 2 showing a variable pump apparatus used in the power transmission.

Referring first to FIG. 1, a power system is illustrated incorporating the subject invention comprising prime mover 11 connected through drive shaft 12 to power transmission 13 from which extends second drive shaft 14 to driven unit or load 15 (not shown) which may be the driven wheels of a vehicle or any other driven load connected through shaft 16. While in this description the power system is described as driving a mobile vehicle, it should be kept in mind that the load could just as well be a stationary apparatus. Control unit 17 is illustrated with various mechanical connections to the individual components of the system which will be explained in detail later.

*Power transmission*

Referring now also to FIG. 2, power transmission 13 is illustrated suitable for use in the subject power system to provide continuous drive ratio capabilities between the prime mover and the load. This transmission includes a housing comprising end bells 20 and 21, and side cover 22. Extending through end bell 20 is input shaft 23 rotatably supported in bearing 24, positioned between end bell 20 and the shaft. Seal 25 surrounds shaft 23 to keep dirt and other foreign matter out of the housing and to retain oil or lubricant within the power transmission. Input shaft 23 has splined end 26 for attachment to drive shaft 12 extending from prime mover 11, and extends into the housing with its other end projecting into opening 30 of output shaft 31. Input shaft 23 is rotatably supported within the end of output shaft 31 by bearing 32 thereby providing mutual support between these shafts while output shaft 31 is in turn rotatably supported from end bell 21 by bearing 33. Seal 34 extends between output shaft 31 and end bell 21 for the same purposes as seal 25. Output shaft 31 is provided with splined end 35 for attachment to any driven load.

As illustrated by FIG. 3, a planetary gear system is connected to input shaft 23 of power transmission 13 and includes sun gear 38 which rotates with input shaft 23. Attached to output shaft 31 is planet gear support member 39 supporting three planet gears 40 which engage sun gear 38 and may rotate about their individual supporting shafts 41. Ring gear 42 extends around and engages these three planet gears 40. Except when the peripheral speed of sun gear 38 is equal and opposite to the interior peripheral speed of ring gear 42, a reaction results between planet gears 40 and ring gear 42 causing rotation of output shaft 31. The maximum rotational speed of output shaft 31 is determined in part by the particular gear ratio between sun gear 38, planet gears 40 and ring gear 42.

The relative speed of rotation and therefore the gear or drive ratio between the input and output shafts may be varied by varying the relative rotation of ring gear 42 with respect to sun gear 38. If for example, sun gear 38 is rotated in the clockwise direction and ring gear 42 were held stationary, a counterclockwise rotation of planet gears 40 would result, thus causing a clockwise rotation of planet gear support member 39 and output shaft 31. However, if ring gear 42 is accelerated in the counterclockwise direction, the rotation of the planet gears and hence the output shaft is decreased until the peripheral speed of the gear surface of ring gear 42 is equal to the peripheral speed of the gear surface of sun gear 38. When the latter situation occurs, planet gear support member 39 and output shaft 31 will remain stationary. Further acceleration of ring gear 42 in the counterclockwise direction causes planet gear support member 39 to rotate in the counterclockwise direction. Similarly, if ring gear 42 is rotated in the same direction as the sun gear 38, planet gears 40 will rotate at a peripheral speed equal to the sum of the peripheral speeds of these gears causing a faster rotation of output shaft 31.

Hydraulic unit 44 is provided for controlling the rotation of ring gear 42 and consists of variable displacement pump unit 45 and motor unit 46. While these units are nominally referred to as pump and motor units, it should be understood that under certain conditions the functions of the units may be reversed, that is the motor will act as a pump supplying power to drive the pump then acting as a motor. Units 45 and 46 each include a row of ball pistons 47 and 48 which may freely reciprocate within cylinder blocks 49 and 50. Pump cylinder block 49 is connected by flange 51 to rotate with input shaft 23. Flange 51 may be attached to cylinder block 49 by any suitable means such as bolt fasteners 52. Motor cylinder block 50 is attached to and supports ring gear 42 for rotation. Ball pistons 47 and 48 reciprocate within cylinders 49a and 50a; however, as small a clearance as possible is provided to permit free movement of the ball pistons while still preventing excessive leakage of fluid past these ball pistons. Cylinders 49a and 50a are provided with fluid ports 54 and 55 respectively when open radially inwardly. As illustrated in FIGS. 2 and 4, the cylinder blocks are rotated about stationary pintle 56 in which are formed pintle passages 58 and 59 which extend partially around the pintle, and provide fluid connection between fluid ports 54 and 55.

Pintle 56 is supported by pintle support member 57 extending from housing side cover 22 and fastened by bolt fasteners 62. The pintle and pintle support member also serve to support input shaft 23 for rotation by roller bearings 63 and ball bearings 64 located between the shaft and the pintle. The different bearing types are utilized to best carry the particular loads to which the bearings are subjected. Pump race 65 is pivotally supported on one side from pintle support member 57 by bolt 67, with its opposite side supported by positioning rod 68. Positioning rod 68 extends between pump race 65 and race positioning actuator 69, and is connected to the race by ball joint 70. The position of race 65 may be varied with respect to cylinder block 49 as will be explained in more detail later. Motor race 66 in this embodiment is fixedly supported and eccentrically positioned with respect to cylinder block 50 by support member 66' and bolt 67 extending between race 66 and pintle support 57.

Race positioning actuator 69 includes housing 71 supported from housing side cover 22. Housing 71 contains cylindrical cavity 72 having fluid ports 73 and 74 connecting each end to hydraulic control cavity 75. Piston 76 is located for reciprocal movement in cavity 72 with attached positioning rod 68 extending through opening 77 in housing 71 to ball joint 70 on pump race 65.

Control rod 80 extends through opening 83 in housing side cover 22 and into control cavity 75 with spaced pistons 81 and 82 attached thereto for reciprocal movement within control cavity 75. Fluid inlets 85 and 86 lead to control cavity 75 with outlet 87 situated between these inlets and leading from the cavity. In operation, control rod 80 is positioned so that pressurized fluids supplied to inlets 85 and 86 will be admitted through either fluid port 73 or fluid port 74 to cavity 72, thereby forcing piston 76 to move longitudinally within cavity 72. This movement of piston 76 causes positioning rod 68 to pivot race 65 about bolt 67 to a desired eccentric position with respect to cylinder block 49. As will be explained later, this provides pump unit 45 with a variable positive displacement capability.

Referring again to FIG. 2, any hydraulic fluid escaping from hydraulic unit 44 flows to the bottom of the housing to serve both to lubricate the moving parts of the transmission and to act as a reservoir for pump 90. Pump 90 is driven by gear 92 meshing with gear 91 on input shaft 23. Check valves 93 and 94 are provided respectively in hydraulic lines 95 and 96 (illustrated as broken lines) leading to pintle passages 58 and 59. In this manner any fluid that need be replaced within the hydraulic unit is supplied to the low pressure passage of the pintle.

The operation of hydraulic unit 44 will now be described with reference to FIG. 4. Referring to the positions around race 65 as numbers on a clock, it will be noted that as cylinder block 49 rotates, ball pistons 47 are forced outwardly by centrifugal force against the inner surface of race 65. As the ball pistons ride along this inner surface of race 65, the eccentricity of the race with respect to the cylinder block forces the balls to reciprocate within cylinders 49a. If low pressure hydraulic fluid is introduced into pintle passage 59 by pump 90, and the cylinder block is rotated in a clockwise direction, as the balls progress from the three o'clock position to the nine o'clock position cylinders 49a will be filled with low pressure hydraulic fluid due both to the outward movement of the balls in these cylinders creating a low pressure region in the cylinder, and also to the pressure of the hydraulic fluid in pintle passage 59 forcing flow into the cylinders. As cylinders 49a pass the nine o'clock position, fluid ports 54 connect cylinders 49a with pintle passage 58. With the cylinders now proceeding from the nine o'clock position to the three o'clock position, ball pistons 47 are forced inwardly into cylinders 49a, forcing fluid out of the cylinders through fluid ports 54 into pintle passage 58 at high pressure until the cylinders reach the three o'clock position, thereafter this cycle is repeated with every revolution of the cylinder block. By controlling the amount of eccentricity of pump race 65 with respect to cylinder block 49, the amount of fluid pumped by the ball pump may be regulated. The position of race 66 of the motor unit 46 could also be varied, although it is not in this embodiment.

The high pressure fluid forced into pintle passage 58 by pump unit 45 is conveyed to motor unit 46, where it exerts a force against the ball pistons 48 in the nine o'clock to three o'clock positions tending to move these ball pistons outwardly. A reaction is thereby effected causing cylinder block 50 to rotate. Therefore with motor unit 46 connected to pintle passages 58 and 59, pump unit 45 may be utilized to drive this motor unit.

A continuously variable speed range may be provided between pump unit 45 and motor unit 46 by varying the eccentricity of pump unit 45. If pump unit 45 and motor unit 46 have the same capacity, their rotational speed will be the same. With race 66 of motor unit 46 fixed, it will be seen that the speed of the motor unit is controlled by the eccentricity of race 65. If the capacity of pump unit 45 is greater than that of motor unit 46, motor unit 46 must rotate faster than pump unit 45 to handle the same amount of fluid. Further, by reversing the eccentricity of the pump unit, the motor unit may be driven in a reverse direction. It will be noted at this point that pintle passages 58 and 59 form a closed hydraulic circuit interconnecting pump unit 45 and motor unit 46. The entire flow of hydraulic fluid pumped by pump unit 45 is utilized in driving motor unit 46. Any fluid which escapes is, of course, replaced through hydraulic lines 95 and 96 as described above.

Keeping in mind the operation of the hydraulic unit and the operation of the planetary gear system as explained heretofore, it can be seen that by control of the rotation of ring gear 42 through control of the rotation of motor unit 46, the relative rotation between input shaft 23 and output shaft 31 may be varied. The relative rotational speeds of input shaft 23 and output shaft 31 are determined in part by the gear ratios of the gears in the planetary gear system. The size of cylinders 49a and 50a in cylinder blocks 49 and 50 respectively, and the amount of eccentricity to which pump race 65 may be adjusted, determine the capacities of the units and hence the range of relative rotational speeds of the pump and motor units which in turn determine the relative speeds of sun gear 38 and ring gear 42. Even greater drive ratios may be effected by making the eccentricity of motor race 66 adjustable. The subject transmission also serves to effect a reversal of the direction of rotation of output shaft 31 with respect to input shaft 23 by allowing pump unit 45 to drive motor unit 46 in the opposite direction from that of the input shaft by shifting the eccentric positioning of pump race 65 to the opposite side of cylinder block 49. Further, this rotation in the reverse direction as well as the rotation in the forward direction is continuously variable because the pumping capabilities of pump unit 45 are made continuously variable by shifting the position of pump race 65.

Control unit

Figure 5:
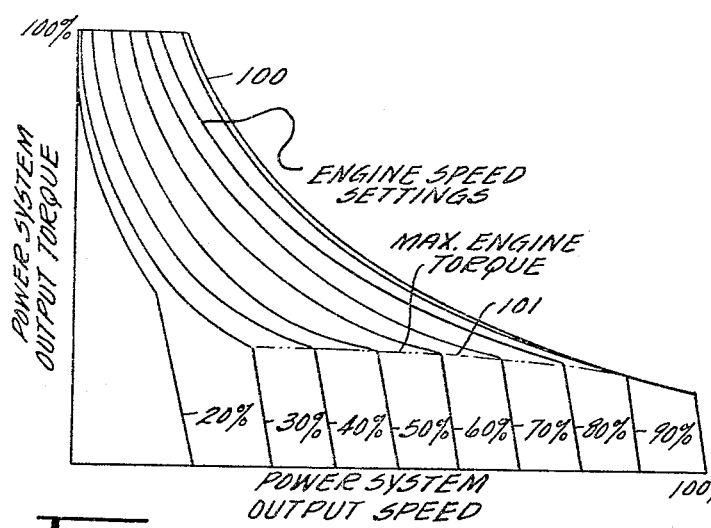
FIG. 5 is a graphical representation of operating characteristics of the prime mover of FIG. 1.

Referring to FIG. 1, control unit 17 coordinates the speed of prime mover 11 and the drive ratio of power transmission 13 to supply the power system output speed called for in the optimum manner. While an operator can determine the output speed desired, it is practically impossible to manually vary both the prime mover speed and the transmission drive ratio for optimum operation of the power system, therefore this control utilizes a desired speed signal for optimum control of both. This control may be applied to any prime mover having a motive fluid input; however, for purposes of this explanation an internal combustion engine is used thereby giving the power system the representative operating characteristics illustrated in FIG. 5. The power system output speed is shown as the abscissa and the power system output torque as the ordinate.

In controlling an internal combustion engine the point of operation for highest efficiency occurs when the prime mover is operating at the lowest speed that will produce the required horsepower to supply the output speed called for. However, with such engines the maximum horsepower output occurs at full engine speed while maximum engine torque occurs at a lower speed. Therefore the solid lines 100 indicate combinations of power system output speed and torque available for constant engine speed settings with the numbers indicating the percent of maximum speed setting for the engine. In other words, by changing the drive ratio of the power transmission, the power system will produce the combination of speed and torque indicated by any point along the line for a given prime mover speed setting. However, as indicated by dot-dash line 101, if the drive ratio of the transmission remains constant the system output speed will decrease rapidly along the maximum engine torque line 101 as the output torque requirement is increased. It is therefore desirable to provide a continuously variable drive ratio power transmission as described heretofore to allow the prime mover to operate at its lowest speed while satisfying the horsepower requirement, and further to provide a control unit for coordination of the controls of the power transmission and prime mover to allow for continuous optimum operation of the power system throughout the complete load requirements of the driven unit.

FIG. 1 indicates one embodiment of control means 17 for correlating the motive fluid input to prime mover 11 with the drive ratio of power transmission 13 for the optimum power system performance outlined heretofore. Throttle input signal rod 104, connected to control unit 17, is positioned by accelerator or throttle 103 and represents the speed output required. Also, drive selector 105 is connected to the control unit by drive selector control rod 106 by which the operator may indicate such drive signals as "forward," "reverse" and "neutral." Since the purpose of the control unit in controlling the power system is to correlate both the drive ratio of the power transmission and the motive fluid input to the prime mover, control unit 17 provides speed error signal 107 to prime mover motive fluid input regulator or carburetor 108, and provides ratio control signal 109 to power transmission 13 for regulating the drive ratio. Also, a prime mover speed feedback signal is provided by prime mover 11 through conduit 110 to control unit 17 to signal the actual operating speed of the prime mover; and hydraulic line 111 connects control unit 17 with a constant pressure fluid source, which in this instance is supplied by the hydraulic unit of the power transmission.

To explain the operation of the control unit the block diagram of FIG. 6, and FIG. 1 will be referred to. Throttle input signal 104 is directed into control unit 17 and fed into speed schedule 113 which initially determines the desired prime mover speed as a function of the accelerator position. From there, speed reference signal 114 is fed to speed error sensor 115 which compares this speed reference signal with prime mover speed feedback signal 116 to determine the actual throttle position necessary to effect the required speed called for by the positioning of accelerator 103. Speed error signal 107 is fed to carburetor 108 for proper metering of fuel to prime mover 11 thereby effecting the required prime mover speed. The prime mover output is transmitted through drive shaft 12 represented by line 12 in FIG. 6, to power transmission 13 for subsequent transmission to a load.

As mentioned heretofore, the purpose of this control is to integrate the control systems for the motive fluid input to the prime mover and the drive ratio of the power transmission, therefore throttle input signal 104 is also fed to ratio schedule 118 which determines the initial drive ratio of the power transmission for that throttle position. Ratio schedule signal 119 is fed to ratio actuation means 120 which also receives the drive selector input by control rod 106 through which may be selected in most cases a "forward," "neutral" or "reverse" drive. Thereafter, ratio control signal 109 goes to power transmission 13 which, when powered by prime mover 11, produces an efficient output torque and speed through second drive shaft 14 for that accelerator input signal and prime mover operating speed. Prime mover speed feedback signal 116 continuously signals to the control unit the operating speed of the prime mover and thereby allows the control unit to determine and regulate the prime mover speed to meet the power output requirements called for by the setting of the throttle.

A further modification of this control means may be provided by feeding speed error signal 107 to primary ratio over-ride means 121, and from there to drive ratio actuation means 120. In actual operation, when prime mover speed feedback 116 indicates that the load is causing the prime mover speed to fall below that required by the throttle input signal 104, an immediate speed error signal 107 is fed to carburetor 108 to maintain the required prime mover speed and therefore the power output of the power system at the desired level. However, after a predetermined magnitude of speed error is reached it may be that for that throttle input signal sufficient power is not being supplied by the power system at that drive ratio to maintain desired speed. More motive fluid must therefore be supplied than is ordinarily required to the prime mover for that throttle setting to allow the prime mover to operate at maximum power output. If neither the fluid input nor the drive ratio is readjusted, the prime mover speed and therefore the system output speed will diminish along the maximum torque line. As illustrated on the graph of FIG. 5, this maximum torque operating level is substantially below the full power output capabilities of the system and therefore the full capabilities of the prime mover are not used and little additional torque is supplied by the power system under these constant drive ratio conditions. To alleviate this, speed error signal 107 is fed through primary ratio over-ride means 121 to ratio actuation means 120 to change the drive ratio of the transmission to that ratio necessary to allow the prime mover to operate at maximum horsepower output. In this manner the prime mover is first controlled through an increase in motive fluid input to maintain the output power necessary for that speed setting, however, if the system is still unable to maintain the required speed indicated by the speed input signal, the primary ratio over-ride will cause the drive ratio to be changed to where the prime mover is allowed to operate at maximum horsepower output with the power system output speed decreased by the change in the drive ratio in power transmission 13.

A secondary ratio over-ride is also provided within primary ratio over-ride means 121 in which drive ratio actuation means 120 is operated by speed error signal 107. The purpose for this over-ride is to prevent excessive overspeeds of the prime mover which might occur if the driven unit is driven at a given speed and the throttle setting is suddenly decreased. An initial reaction of the control is to signal a reduction of the motive fluid input signal to the prime mover thereby slowing the driven unit. But there will be some time delay in the speed reduction of the driven unit due to inertia and in the meantime the drive ratio actuation means may adjust the ratio control signal to the transmission calling for a lower drive ratio. During this time the momentum of the driven unit may be enough to maintain speed momentarily and the power input back into the transmission and through the altered drive ratio may cause overspeeding of the prime mover. The secondary ratio over-ride prevents this occurrence by delaying the changing of the transmission drive ratio until the load speed is reduced to a safe level.

Mechanical control unit

Turning now to FIG. 7, the mechanical embodiment of control unit 17 is illustrated embodying the concepts heretofore described. Control unit 17 comprises housing 130 into which lead: throttle input signal rod 104, drive selector control rod 106 from drive selector 105; inlet 133 to which prime mover speed feedback signal 110 is connected ducting fluid flow responsive to prime mover speed; and inlet 134 ducting a constant pressure fluid through hydraulic line 111. Leading from the control unit is speed error signal rod 107 and drive ratio control signal rod 109. Drive ratio control signal rod 109 is identified in FIG. 4 with number 80.

Turning now to the internal assembly of this control unit, throttle input signal rod 104 is movable longitudinally through opening 137 in the housing with compression spring 138 located between housing 130 and flange 139 to bias the throttle rod away from the control unit housing. This throttle control may be operated by a vehicle accelerator pedal. Attached to throttle input signal rod 104 is control cam 140 having control cam surfaces 141 and 142. Control cam surface 141 generates, with cam follower 143, a position signal proportional to the desired speed of the prime mover. As cam follower 143 moves longitudinally, pivot pin 144 is moved together with link 145. With movement of link 145 and pin 146, attached valve rod 147 and valve 148 are moved within valve cavity 149. Valve cavity 149 is formed within member 150 which is in turn threaded into housing 130 for removal therefrom for cleaning and repair. Compression spring 151 is located at the end of valve cavity 149 to load the cam follower against the cam.

Also connected to link 145 by pin 154 is piston rod 155 to which is attached speed error piston 156. Pin 154 extends through slot 157 in piston rod 155 and is biased to one end of the slot by compression spring 158 extending between the members 159 and 160, with member 159 attached for movement with piston rod 155. In this manner, link 145 and piston rod 155 move together up to a certain point, however, any subsequent movement of piston rod 155 past the limits of movement of link 145 requires compresison of spring 158. Speed error piston 156 is located within piston cavity 161 and divides this cavity into cavities 162 and 163. Constant pressure inlet 134 connects with cavity 162 while the prime mover speed signal in the form of a pressured fluid flow from a positive displacement pump (not shown) driven by the prime mover is ducted to inlet 133 connecting with cavity 163. Port 164 connects the cavities 163 and 165 with the fluid flow therethrough controlled by positioning of valve 148. Moving with the piston rod 155 are member 160 and rod 167. Rod 167 is linked by pin 169 so as to pivot connecting link 168 about support member 170, and moves longitudinally speed error signal rod 107 pivotally attached by pin 171 to link 168.

To explain the operation of this portion of the control, assume that throttle input signal rod 104 is depressed to compress spring 138 and move control cam 140 downward. This movement of control cam 140 moves cam follower 143 to the left by virtue of its contact with cam surface 141. Concurrently, a constant pressure input is supplied through inlet 134 to cavity 162 tending to move speed error piston 156 to the right while a positive displacement pump driven by the prime mover is supplying fluid flow through inlet 133 into cavity 163 tending to move piston 156 to the left. As cam follower 143 moves to the left, it pivots link 145 about pin 154 (since movement of pin 154 is restrained by the balanced piston 156), to move valve rod 147 to the left. Movement of valve rod 147 to the left moves valve 148 to the left to open port 164. By opening port 164 and allowing fluid to flow from cavity 163 through the port 164 and cavity 165 into housing 130, a pressure reduction is effected within cavity 163 causing piston 156 to move to the right because of the constant pressure in cavity 162. Movement of piston rod 155 to the right causes compression spring 158 to move member 160 to the right which in turn moves rod 167 causing connecting link 168 to pivot speed error signal rod 107 about support member 170 to signal the motive fluid regulator (carburetor 108) that more motive fluid is required by the prime mover. This condition continues until the prime mover speed rises to increase the flow within the cavity 163 by action of the fluid supplied by the positive displacement pump driven by the prime mover; this flow increase will cause piston 156 to move to the left until the forces on each face of the piston exerted by the pressured fluid in cavities 162 and 163 are again equal. At this time, in accordance with the position of cam follower 143, an equilibrium will be reached between port 164, the control fluid pressure within cavity 163, and the positioning of the various linkages including speed error signal rod 107, to regulate the desired prime mover speed called for by the power setting of throttle input signal rod 104.

It will be noted that when piston 156 moves to the right it will move piston rod 155 and link 145 thereby causing valve rod 147 and valve 148 to move slightly to the right to close port 164 thereby lessening the flow through port 164. In this manner a negative feedback is supplied within the control linkages to damp the action of the control unit and prevent overcompensation of the control.

Rod 167 is fastened by pin 166 to move with member 160. Compression spring 173 extends between rod flange 167' and member 160 to bias pin 166 and member 160 to one end of slot 172 such that generally member 160 and rod 167 move in unison; however, the spring-slot arrangement allows for overtravel of member 160. Adjustable stop 174, supported from housing 130, provides a travel limit for rod 167 to allow adjustment of the minimum fuel input that is allowed by the control.

That portion of control unit 17 which regulates the drive ratio control actuator of the power transmission by actuating drive ratio control signal rod 109 will now be considered. When throttle input signal rod 104 is depressed, cam control surface 142 effects a longitudinal movement of cam follower rod 175 which rides along this control surface due to the biasing of compression spring 183. Piston 178 is attached to the end of rod 175 and located for reciprocal movement within cavity 179 formed within cylinder 180. Cylinder 180 is itself reciprocally located within housing cavity 181 in housing extension 177. Spring 183 is of a smaller constant than spring 176 and extends between cylinder 180 and housing extension 177. Passage 184 extends through piston 178 and cam follower rod 175, from the cavity 179 to the interior of housing 130. Port 185 through cylinder 180 connects cavities 179 and 181. Sudden longitudinal movement of cam follower rod 175 to the right in the drawing causes piston 178 to move to the right within the cavity 179 overcoming the bias of spring 176. Fluid is expelled from cavity 181 through port 185 and from cavity 179 through passage 184. Eventually, as the pressures are equalized by flow through port 185 the cylinder 180 will move to the right carrying with it the connector 188.

With the movement of cylinder 180, connector 188 will pivot link 189 about pin 190 located on over-ride rod 191. Over-ride rod 191 is supported for longitudinal movement within housing members 192 and 177, and is biased to the left by spring 193 positioned between flange 194 and housing extension 177. Ordinarily pin 190 is stationary; however, in special circumstances which will be explained later, primary over-ride rod 191 and pin 190 may also move to generate a stroke signal. With the pivoting of link 189 about pin 190, the position of pin 195 is shifted to move rod 196 longitudinally. Movement of rod 196 shifts pin 197 longitudinally resulting in a pivoting of slotted link 198 about pin 201 of drive selector control rod 106. Rod 205, pivotally attached to slotted link 198 by pin 200 is moved longitudinally which in turn pivots link 206 about pin 207, supported from secondary over-ride rod 208, to subsequently move the drive ratio control signal rod 109 connected to link 206 by pin 209.

The direction of the movement of drive ratio control signal rod 109 depends upon the position of pivot pin 201 about which slotted link 198 pivots. The position of pivot pin 201 is determined by the longitudinal position of drive selector control rod 106 which, with pin 201, moves longitudinally within slotted link 198. With the drive selector control rod in position 202, the "forward" drive position, drive ratio control signal 109 will move in the opposite direction to that of rod 196. With drive ratio control signal rod 106 positioned in phantom position 203, and pins 209 and 201 positioned adjacent to each other, any movement of rod 196 merely pivots slotted link 198 about pin 201 with no subsequent movement of the drive ratio control signal rod 109. This position corresponds to a "neutral" position of the transmission drive selector. By positioning drive selector control rod 106 in phantom position 204, the "reverse" drive position, drive ratio control signal rod 109 will move in the same direction as rod 196.

As explained heretofore, moving drive ratio control signal rod 80, as indicated in FIG. 4, positions race positioning actuator 69 to subsequently position piston 76 for controlling the direction of stroke and amount of stroke of pump unit 45. In this manner, the positioning of drive selector control rod 106 in modulating the movement of the control rod 196 of the control unit selects the direction of stroke, while control unit 17 operates the actual stroke signal.

Turning now to the function of primary over-ride rod 191, the speed of the prime mover when compared to the actual speed called for by the positioning of throttle input signal rod 104 is an indication of the load on the power system. If the speed error piston 156, as a result of a decrease in the flow in cavity 163, moves to the right, it will through the various linkages move speed error signal rod 107 to increase the fuel or motive fluid input to the prime mover. However, in some instances the load is great enough that the prime mover cannot meet the torque requirements at the drive ratio set by the accelerator or throttle position signal even with the maximum motive fluid permitted by this arrangement supplied to the prime mover, and the power system will not maintain the speed called for by the accelerator position. Therefore, as piston rod 155 moves further to the right, it will move the distance indicated at 210 to allow the motive fluid regulating mechanism to increase motive fluid input still further to regain the speed required of the power system. If after that further travel provided by piston rod 155 the speed of the prime mover is not sufficient as indicated by the fluid flow in the cavity 163 to return speed error piston 156 to an equilibrium position, piston rod 155 will contact primary over-ride rod 191 and cause this rod 191 to move to the right. By movement of over-ride rod 191, link 189 is pivoted about connector 188, which remains stationary, to move rod 196 to the left and decrease the stroke or drive ratio of the power transmission by movement of the drive ratio control signal rod 109. By the mechanism just described, the motive fluid regulator portion of control unit 17 maintains the required speed of the power system up to a certain point, and thereafter a signal is originated in the motive fluid regulator portion to reduce the drive ratio of the power transmission and increase the torque capabilities of the power system to meet the load demands indicated by the power setting of the control.

As explained before, cylinder 180 and piston 178 tend to move together since the constant of spring 176 is higher than that of compression spring 183. Movement of cam follower rod 175 from left to right is opposed by the spring 183, extending between cylinder 180 and housing extension 177, and the fluid in housing cavity 181 which is expelled through port 185 as explained heretofore. However, if the throttle position signal is such as to allow a quick movement upward of the throttle input signal rod 104, the main control will attempt an immediate change in the stroke or drive ratio of power transmission 13 which could result in excessive dynamic braking within the power system because of this drive ratio change. To prevent this, when control cam 140 is moved such that control cam surface 142 allows cam follower rod 175 to quickly move to change the drive ratio, movement of the cylinder 180 to the left is retarded by the partial vacuum created in housing cavity 181 which is gradually reduced by the limited amount of fluid that may pass through port 185.

The operation of the secondary over-ride is as follows: frequently when the load is reduced on a power system the prime mover will be subjected to overspeed. For instance in the subject power system, if the accelerator input is decreased, the first action of the basic primary drive ratio control mechanism would be to alter the drive ratio of the transmission. However, if the driven load maintains enough momentum, the change in gear ratio could result in overspeeding the prime mover. The purpose of the secondary over-ride is to prevent this overspeed. This is accomplished by connecting member 160 by means of link 212 to secondary over-ride rod 208. Secondary over-ride 208 supports link 206, which transmits the transmission drive ratio signal. If throttle input signal rod 104 is suddenly released, it will, as explained before, cause an immediate reduction in motive fluid to the prime mover tending to reduce the prime mover speed and change the transmission drive ratio. This will decrease the flow through prime mover speed feedback signal conduit 110 into cavity 163 allowing speed error piston 156 and member 160 to move to the right. However, if the prime mover is caused to maintain speed due to the momentum of the driven load acting through the altered drive ratio in the transmission, the flow in prime mover speed feedback signal conduit 110 will again increase, causing speed error piston 156 annd member 160 to move to the left. Movement of member 160 to the left allows rod 167 to contact adjustable stop 174 and moves link 212 counterclockwise about its pivot. Secondary over-ride rod 208 is also carried to the left by pin 213 on link 212 thereby causing link 206 to pivot clockwise about rod 205 and move ratio control signal rod 109 to the left. This movement of rod 109 maintains the drive ratio of the transmission substantially constant to prevent overspeed of prime mover 11. By this over-ride, the drive ratio is continuously controlled to allow the prime mover to be driven at a maximum speed thereby providing a controlled maximum dynamic braking effect on the load through the drive system.

Dynamic braking control

Another important capability of the subject power transmission comes into play when inertial forces cause driven unit 15 to impart torque back through drive shaft 14 to output shaft 31 to cause a flow of torque in the opposite direction in the transmission. This condition would occur for instance, if the power transmission were used to transmit power to the wheels of the vehicle and the vehicle were allowed to coast down hill. Slowing of the vehicle by use of the prime mover is referred to as dynamic braking and if controlled properly may provide a valuable function to the power system. During dynamic braking torque is transmitted through output shaft 31 to the planetary gear system. Sun gear 38 by being directly attached to input shaft 23 tends to resist being rotated at a speed greater than that of the prime mover, and with the prime mover at an idle or low power setting, it will serve to resist a faster rotation and thereby brake the load.

Assuming that the stroke of hydraulic unit 44 is such that the rotation of cylinder block 50 and ring gear 42 allows output shaft 31 to rotate at the speed it is being driven by driven unit 15, there will be no torque transmitted from output shaft 31 to input shaft 23, and no dynamic braking of the driven unit. As the stroke of hydraulic unit 44 is changed to decrease the speed of rotation of cylinder block 50 and ring gear 42, there will be reactive forces set up in the planetary gear system in attempting to prevent the planet gear support member 39 and planet gears 40 from rotating. This transmits torque back to input shaft 23, and subsequently to prime mover 11, to effect dynamic braking of driven unit 15. The amount of torque transferred (and the amount of dynamic braking), is controlled by the adjustment of the stroke on hydraulic unit 44.

It is necessary to assure that the prime mover is not subjected to an overspeed condition during dynamic braking. As the prime mover is accelerated by this reverse torque condition in braking the load, the flow through prime mover speed feedback signal conduit 110 increases, causing speed error piston 156 to move to the left. Member 160 is moved accordingly to pivot link 212 counterclockwise and move secondary over-ride rod 208 to the left. As explained before, this alters the drive ratio of the transmission to slow the rotation of the prime mover. In this manner torque may be transmitted in either direction in a controlled amount within this power transmission and the amount of dynamic braking impressed on the driven unit may be controlled precluding excessive torque stresses being transmitter back to the prime mover, and allowing the operator to slow the vehicle in controlled manner within the maximum dynamic braking capabilities of the prime mover.

Electrical control unit

Consider next FIG. 8 wherein is illustrated a schematic of an electrical embodiment of control unit 17. This embodiment utilizes control input signals responsive to throttle input and prime mover speed to control the power transmission drive ratio by means of torque motor 220, and to supply a throttle signal through conductor 221. Tachometer generator 222 is driven by the prime mover to generate a voltage signal proportional to the speed of the prime mover. Positive terminal 223 of the tachometer is grounded and negative terminal 224 is connected through current limiting resistor 225 to juncture 226. Potentiometer 228, connected to the positive terminal of voltage source 229, has slider arm 230 connected to move with an accelerator or throttle 227 such that a voltage signal is generated proportional to the accelerator position and therefore proportional to the speed of operation required of the power system.

The accelerator voltage signal passes through conductor 231 and resistor 232, connected in parallel with glow tube 233 and resistor 234, to juncture 226 where it opposes, because of opposite voltage polarities, the prime mover speed signal voltage. Resistor 232 is of sufficient resistance to limit the accelerator voltage signal to a small magnitude until the glow tube 233 fires, at which time the resistor is shunted by the tube and resistor 234. Since the gain of amplifier 235 is the ratio of the feedback resistor 249 to the input resistor 232, when resistor 232 is shunted by glow tube 233, the gain increases, and in this manner proper speed scheduling is obtained. From juncture 226, the summation of these voltage signals is conducted as the throttle control signal to a suitable motive fluid regulator or carburetor (not shown) to regulate the motive fluid input to the power unit. The signal at juncture 226 represents the speed error and this same signal is further conducted through conductor 237, tube 238 and resistor 252 to juncture 239 from which this drive ratio signal is amplified through amplifier 235. Tube 238 constitutes the primary over-ride for the purpose of readjusting the drive ratio signal if the speed error signal is great enough to cause glow tube 238 to conduct indicating that the prime mover is not able to gain the required speed under the present load conditions.

To explain the generation of the drive ratio signal, conductor 242 conducts the accelerator voltage signal through resistors 243, juncture 244 and resistors 245 to juncture 239. Glow tube 246 connects juncture 244 to ground. It can be seen that until the conduction voltage of glow tube 246 is reached, the resistors will produce a voltage signal proportional to the accelerator voltage signal, when the conductive voltage of glow tube 246 is subsequently reached, the voltage signal conducted to juncture 239 remains constant at that conductive voltage. Capacitor 250 is connected to ground from between resistors 245 to obtain a time delay in the drive ratio control signal so that the speed control circuit can respond in proper sequence.

Through conductor 253 and tube 254 to juncture 239 is provided a secondary over-ride function which works in opposition to the primary over-ride through tube 238. Since the polarity of the speed error signal determines which over-ride is appropriate, the tubes automatically select the proper over-ride.

The voltage signal at juncture 239 results from the addition of the voltages from conductors 242, 237 and 253 and is subsequently transmitted through amplifier 235 to feedback resistor 249 and drive selector switch 247 to torque motor 220 which actuates the drive ratio selector mechanism of the power transmission in response to the signal. The drive selector switch merely serves to provide forward, reverse or neutral selector positions by reversing the polarity of the voltage with respect to the torque motor, also by disconnecting the torque motor the selector provides a neutral position. A drive ratio position feedback circuit 253 may also be employed if desired. It can be seen that the heretofore described electrical embodiment of the control utilizes the same parameters as the mechanical embodiment in providing the control signals for the overall power system.

Power system operation

In detailing the coordinated operation of the entire power system FIGS. 2, 4, and 7 will be used. It should be remembered that the "neutral" position of the transmission requires rotation of ring gear 42 in a direction opposite from that of sun gear 38 which is directly driven by prime mover 11. Consequently, race 65 of pump unit 45 will be eccentrically positioned, although not as much as shown in FIG. 4, so as to pump hydraulic fluid to motor unit 46 while the transmission is in neutral. Normally while in "neutral," prime mover 11 is operating at idle speed and throttle input signal rod 104 is not depressed thereby allowing cam follower rod 175 to be positioned as far to the left as possible. This means that connector 188 is positioned to the left of its travel and rod 196 is to the left. The positioning of drive ratio control rod 109 in "neutral" is determined solely by the neutral position 203 of pivot pin 201 as was described previously, the throttle setting having no effect.

When drive selector control rod is moved up to "reverse" position 204, slotted link 198 will pivot about pin 201 in a clockwise direction as throttle input signal rod 104 is depressed, ultimately fully extending drive ratio control rod 109 and shifting spaced pistons 81 and 82 to the left in FIG. 4. The eccentricity of race 65 is thereby increased and the flow of hydraulic fluid to motor unit 46 speeds up. As ring gear 42 consequently speeds up, output shaft 31 rotates in the reverse drive direction.

If instead of "reverse," "forward" drive is desired, drive selector control rod 106 is positioned at the 202 location. When the accelerator is depressed to move throttle input signal rod 104 and control cam 140 downward, the initial reaction is for cam follower rod 175 to be moved by control cam surface 142, moving drive ratio control rod 80 of FIG. 4, and subsequently spaced pistons 81 and 82, to the right to decrease the stroke of pump unit 45. With this gradual decrease in stroke in hydraulic unit 44 the speed of rotation of the hydraulic unit 45 and the ring gear 42 will also decrease making the sun gear rotate relatively faster. Continued depression of throttle input signal will eventually position race 65 of pump unit 44 in a central position where only the output of sun gear 38 will be powering output shaft 31, and finally reverse eccentricity of race 65 will occur, adding the rotational speeds of ring gear 42 and sun gear 38.

Assuming that the operator now reaches a desired drive speed, the motive fluid regulator portion of control unit 17 through the balancing of the pressures on each side of speed error piston 156 within cavities 162 and 163 regulates the speed of the prime mover to its lowest possible speed to maintain that speed called for by the power setting of accelerator or throttle 103. When a greater load is impressed on the power system by the driven unit, the immediate reaction within the power system is a decrease in the prime mover speed due to the greater load. Because of this, the prime mover speed pump will slow decreasing the pressure within cavity 163 to allow speed error piston 156 to move to the right. This action causes speed error signal rod 107 to be moved to the left to increase the motive fluid flow to the prime mover and therefore, with no further action on the part of the operator, the increased load will be powered at the required speed called for by the accelerator position by regulating the motive fluid flow to the prime mover. Now assuming that the load is increased with no change in power setting, the piston will move to the right until the pressures within cavities 162 and 163 equalize or else it will continue movement to the right at which time piston rod 155 contacts over-ride rod 191. As over-ride rod 191 moves to the right, the linkages previously described cause a reduction in stroke and drive ratio. This allows the prime mover to continue developing a maximum horsepower and further torque requirements are met by a reduction in the drive ratio as heretofore described.

If the load is thereafter decreased, the first reaction will be an increase in the stroke. If the load is decreased sufficiently, the motive fluid input to the prime mover will be decreased after the drive ratio is at the maximum to maintain the constant output speed required by the power setting and yet allow the prime mover to operate at the lowest speed possible resulting in less wear on the prime mover and a more efficient operation of the power system by reducing the power losses inherent within the prime mover.

It may be seen that this power system incorporates a continuously variable drive ratio power transmission with the main control taking full advantage of the capabilities of the power transmission in a manner to allow optimum operation of the prime mover by decreasing the operating speed in all instances where possible and keeping the drive ratio at a maximum, and thereafter regulating the speed of the prime mover to a minimum to meet the power requirements of the load and still maintain the speed called for by the power setting. When additional loads are impressed on the power system the first reaction of the system is to maintain the maximum drive ratio and increase the operating speed of the prime mover to meet the load requirements. In this manner, the prime mover is then allowed to accelerate to its maximum horsepower output if required, thereby increasing the overall efficiency of the power system by taking full advantage of the power output capabilities of the prime mover. If however, it is found that the prime mover may not meet the torque requirements of the load and maintain that speed called for by the accelerator position, the control unit will then decrease the drive ratio of the power transmission to allow the prime mover to generate a maximum horsepower output and, by altering the drive ratio of the power transmission, still supply the torque required from the power system to drive the load. In the manner described the prime mover is allowed to operate at the lowest speed available to satisfy the power requirements required of the power system which decreases wear on the system and increases the efficiency of the prime mover.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What is claimed as new and desired to be secured by Letters Patent of the United States is:

1. A control unit for a power system including a prime mover and a variable drive ratio transmission comprising:
   a throttle to generate a throttle signal indicating the speed required of the power system,
   signal means responsive to the actual speed of the prime mover,
   means to compare the throttle signal and actual speed signal to generate a differential signal,
   prime mover control means actuated proportional to said differential signal to regulate the operating speed of said prime mover,
   a main transmission control means responsive to the speed required signal to regulate the drive ratio of the transmission,
   and primary over-ride means actuated proportional to said differential signal to over-ride said speed required signal to the main transmission control means and alter said transmission drive ratio,
   whereby if said power system does not supply the power required said over-ride means will select a drive ratio to allow said prime mover to operate at maximum power output.

2. A control unit for a power system including a prime mover and a variable drive ratio transmission comprising:
   throttle means to signal the drive speed desired from the power system,
   a positive displacement pump driven by said prime mover to generate a fluid flow signal proportional to the speed of operation of said prime mover,
   means to compare the desired drive speed signal and the fluid flow signal to generate a differential signal,
   a motive fluid input and input regulating means for the prime mover,
   means responsive to said differential signal for actuating the motive fluid input regulating means,
   a primary transmission control means to regulate the drive ratio of the transmission,
   a secondary transmission control means for regulating said transmission drive ratio in response to said differential signal after a predetermined motive fluid input is required by the regulating means,
   whereby if said power system does not supply the drive speed required said secondary transmission control means will over-ride said primary transmission control and regulate the transmission drive ratio to allow the prime mover to operate at its maximum power output level.

3. A control unit for a power system including a prime mover and a variable drive ratio transmission comprising:
   throttle signal means to signal the drive speed desired from the power system,
   a control cam positioned proportional to said throttle signal and having first and second control surfaces,
   a motive fluid input and input regulating means for said prime mover,
   a positive displacement pump driven by said prime mover to generate a fluid flow proportional to the actual speed of operation of said prime mover,
   a link means positioned by said fluid flow,
   modulating means positioned by said cam first control surface to modulate the position of said link means,
   means connecting said link means to said motive fluid regulating means for controlling the motive fluid input to said prime mover between a minimum and maximum motive fluid input level,
   a drive ratio control for said transmission,
   means actuated by said cam second control surface to actuate said drive ratio control, and
   over-ride means connected to said drive ratio control and actuated by said link means to change the drive ratio of said transmission if said link means attempts to actuate said motive fluid regulating means past the maximum motive fluid input level.

4. A control unit for a power system including a prime mover powered by a motive fluid and a variable drive ratio transmission comprising:
   throttle signal means to signal the drive speed desired from the power system,
   a control cam positioned proportional to said throttle signal and having first and second control surfaces,
   a motive fluid input regulator for said prime mover,
   a positive displacement pump driven by said prime mover to generate a control fluid flow proportional to the actual speed of operation of said prime mover,
   a motive fluid control piston assembly having a motive fluid control piston located for reciprocal movement within a motive fluid control piston cavity having a port on one side of said piston,
   said control fluid flow from said positive displacement pump supplied to said first port leading into said cavity on a first side of said control piston,
   an outlet from said cavity on the same side of said piston,
   means positioned by said cam first control surface to regulate the control fluid flow from said outlet,
   means to supply a constant pressure force to the second side of said control piston,
   means connecting said control piston to said motive fluid regulator for controlling the motive fluid input to said prime mover up to a maximum motive fluid input level,
   a drive ratio regulator for controlling the drive ratio of said transmission,
   and linkage means positioned by said cam second control surface for actuating said drive ratio regulator.

5. A control unit for a power system including a prime mover and a variable drive ratio transmission comprising:
   throttle signal generating means to signal the drive speed desired from the power system,
   a control cam positioned proportional to said throttle signal and having first and second control surfaces,
   a motive fluid input regulator for said prime mover,
   a positive displacement pump driven by said prime mover to generate a control fluid flow proportional to the actual speed of operation of said prime mover,
   a motive fluid control piston assembly comprising a motive fluid control piston located for reciprocal movement within a motive fluid control piston cavity having first and second ports on opposite sides of said piston,
   said control fluid flow from said positive displacement pump supplied to said first port leading into said cavity on a first side of said control piston,
   an outlet from said cavity on the same side of said piston,
   means positioned by said cam first control surface to regulate the control fluid flow from said outlet,
   means to supply a constant pressure fluid to the second side of said control piston,
   means connecting said control piston to said motive fluid regulator for controlling the motive fluid input to said prime mover up to a maximum input level,
   a drive ratio regulator for controlling the drive ratio of said transmission,
   and linkage means positioned by said cam second control surface for actuating said drive ratio regulator,
   and over-ride means connected between said motive fluid regulator and said drive ratio regulator to reduce the drive ratio of said transmission when said motive fluid regulator is regulated to exceed a maximum motive fluid input of the regulator.

6. A power system comprising:
   a prime mover powered by a motive fluid,
   a motive fluid regulator for controlling the motive fluid input to said prime mover between a minimum and maximum input,
   a variable drive ratio transmission connected to transmit power from the prime mover to a load,
   said transmission having a variable positive-displacement ball piston pump and motor,
   a variable race for controlling the stroke of said ball piston motor, means for varying the race stroke to vary the drive ratio of said transmission,
   a control unit for simultaneously controlling said motive fluid regulating means and said stroke varying means comprising:
   a throttle signal means to signal the drive speed desired of the power system,
   means to generate a signal responsive to the actual drive speed of the prime mover,
   means to compare the desired drive speed signal with the actual drive speed signal to generate a differential signal,
   means responsive to said differential signal for controlling the motive fluid regulator,
   means responsive to said signal from said throttle signal means to actuate the means for varying the race stroke of the transmission, and
   over-ride means responsive to said differential signal to vary said stroke race when said differential signal regulates said motive fluid regulator to exceed the maximum motive fluid input to said prime mover.

7. A control unit for a power system including a prime mover powered by a motive fluid and a variable drive ratio transmission comprising:
  means to generate an electrical signal responsive to power output required,
  a generator driven by said prime mover to generate a signal responsive to the prime mover speed,
  means to compare said power output required signal and said prime mover speed signal to generate a differential signal,
  means responsive to said differential signal to control the motive fluid input to said prime mover,
  and means responsive to said power output required signal to control the drive ratio of said transmission.

8. A control unit for a power system including a prime mover with a motive fluid input and a variable drive ratio transmission comprising:
  electrical signal generating means responsive to power output required,
  a generator driven by said prime mover to generate a signal responsive to the prime mover speed,
  means to compare said power output required signal and said prime mover speed signal to generate a differential signal,
  means responsive to said differential signal to control the motive fluid input to said prime mover,
  electrical actuator means responsive to said power output required signal to control the drive ratio of said transmission,
  and means responsive to said differential signal to alter said drive ratio of said transmission.

9. A control unit for a power system including a prime mover powered by motive fluid and a variable drive ratio transmission comprising:
  a generator producing a prime mover speed responsive signal,
  a throttle for indicating power required from said power system,
  means responsive to throttle position to produce an electrical signal,
  means to compare said prime mover speed responsive signal and said throttle responsive signal to produce a differential signal,
  a motive fluid input regulator for said prime mover,
  means responsive to said differential signal to actuate said motive fluid input regulator,
  motor means responsive to said throttle position signal to vary the drive ratio of said variable drive ratio transmission,
  and means to over-ride said throttle position signal with said differential signal to said torque motor when said prime mover speed is reduced below that required by the throttle position.

10. A control unit for a power system including a prime mover powered by motive fluid and a variable drive ratio transmission comprising:
  first signal generating means responsive to the power output required,
  second signal generating means responsive to prime mover speed,
  means to compare said first and second signals to generate a differential signal,
  means responsive to said differential signal to control the motive fluid input to said prime mover,
  means responsive to said power output signal to control the drive ratio of said transmission,
  means responsive to said differential signal to alter said drive ratio of said transmission,
  and means to delay the actuation of said means controlling said drive ratio of said transmission if said power output signal requires an immediate reduction in drive ratio of said transmission.

11. A control unit for a power system including a prime mover and a variable drive ratio transmission comprising:
  a throttle signal generating means responsive to the speed required of the power system,
  signal means responsive to the actual speed of the prime mover,
  means to compare the throttle signal and actual speed signal to generate a differential signal therebetween,
  prime mover control means actuated proportional to said differential signal to regulate the speed of operation of the prime mover,
  a main transmission control means responsive to said throttle signal to regulate the drive ratio of the transmission,
  and primary over-ride means actuated proportional to said differential signal to over-ride and regulate said main transmission control means whereby if said power system does not supply the power required said over-ride means will select a drive ratio to allow said prime mover to operate at maximum power output,
  and means to delay the actuation of said main actuation control means regulating said drive ratio of said transmission if said throttle signal requires an immediate reduction of drive ratio of said transmission.

12. A control unit for a power system including a prime mover, a variable drive ratio transmission and a driven load comprising:
  first signal means responsive to the power output required to said driven load,
  second signal means responsive to the prime mover speed,
  means to compare said power output signal and said prime mover speed signal to generate a third signal,
  means responsive to said third signal to control the operating speed of said prime mover,
  means responsive to said power output signal to control the drive ratio of said transmission, and
  second means responsive to said prime mover speed signal to control the drive ratio of said transmission if said driven load attempts to drive said prime mover to an overspeed condition.

References Cited

UNITED STATES PATENTS

| | | | |
|---|---|---|---|
| 2,178,356 | 10/1939 | Brunner | 74—472 |
| 2,688,259 | 9/1954 | Maybach et al. | 74—472 |

DONLEY J. STOCKING, *Primary Examiner.*

DAVID J. WILLIAMOWSKY, *Examiner.*

H. S. LAYTON, *Assistant Examiner.*